Sept. 19, 1950     A. J. CORSON ET AL     2,522,998
MUTUAL INDUCTANCE TYPE FREQUENCY METER
Filed April 17, 1947     2 Sheets-Sheet 1

Inventors:
Theodore A. Rich,
Almon J. Corson,
by Prowell P Mack
Their Attorney.

Patented Sept. 19, 1950

2,522,998

UNITED STATES PATENT OFFICE 2,522,998

MUTUAL INDUCTANCE TYPE FREQUENCY METER

Almon J. Corson, Marblehead, Mass., and Theodore A. Rich, Schenectady, N. Y., assignors to General Electric Company, a corporation of New York Application April 17, 1947, Serial No. 741,984

5 Claims. (Cl. 172—245)

Our invention relates to a novel type of mutual inductance frequency meter and has for its object a high-grade frequency meter that can be produced at an appreciably lower cost than prior equivalent grade frequency meters in that it utilizes essentially standard instrument parts. Another object of our invention is to provide frequency meters of high sensitivity, torque, and efficiency operating on the principle of varying the mutual inductance relation between a stationary magnetic field and a moving armature coil into which a voltage is introduced which is generally of such phase relation and magnitude as to oppose the induced armature voltage and maintain the armature current at a small value. The voltage introduced in the armature circuit is obtained from across an impedance in the field circuit and is therefore of the same frequency as the armature induced voltage. Furthermore, the impedance is of such a type as to produce variations in voltage and phase with changes in frequency such that the armature is caused to take different mutual inductance positions with change in frequency, so that after calibration it can be used to measure frequency.

Figure 1:
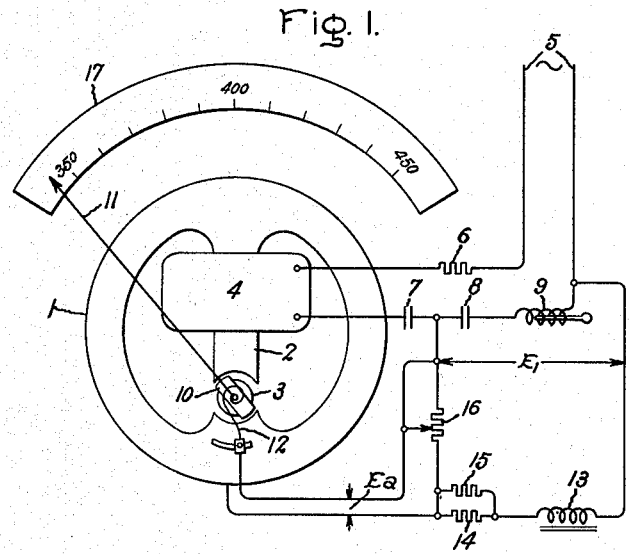
Figure 2:
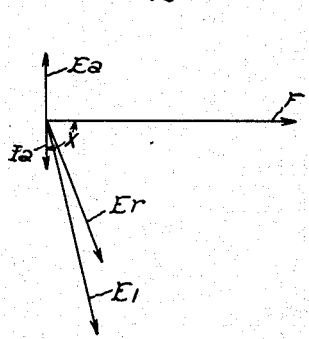
Figure 3:
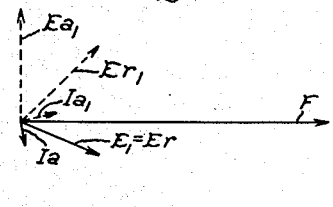
Figure 4:
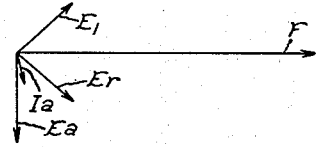
Figure 5:
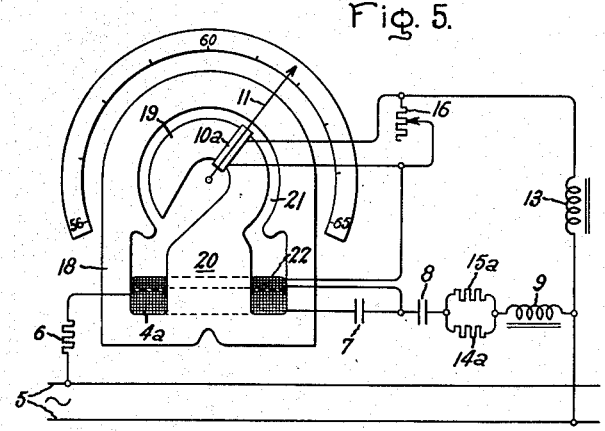
Figure 6:
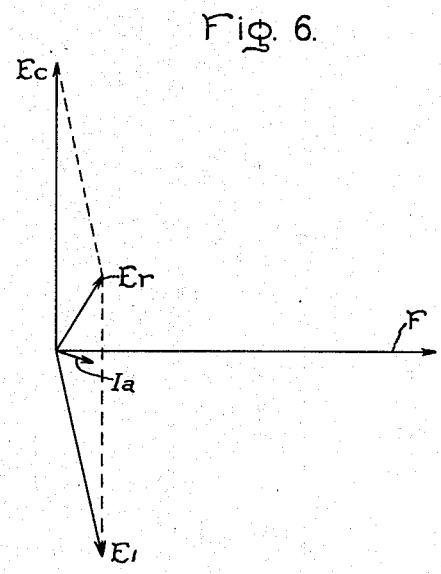
Figure 7:
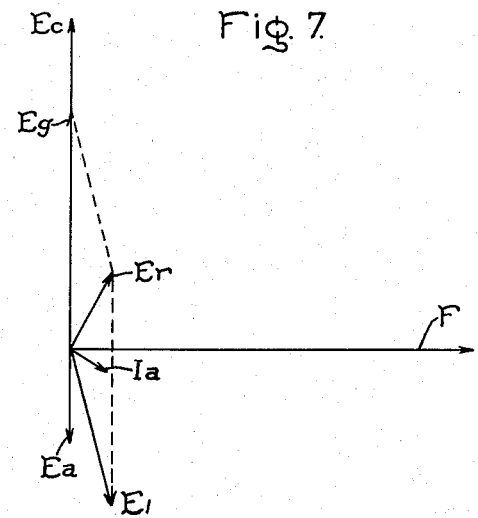
Figure 8:
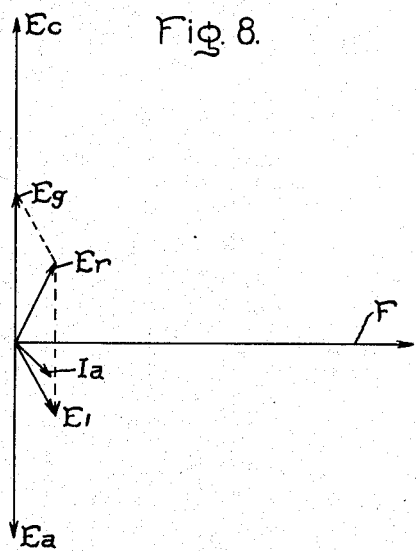
Figure 9:
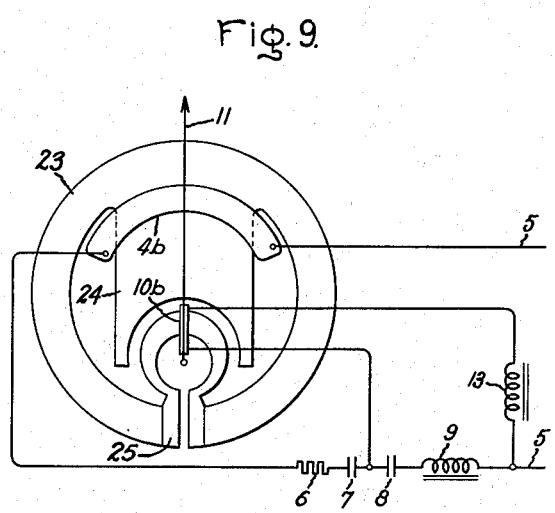

The features of our invention which are believed to be novel and patentable will be pointed out in the claims appended hereto. For a better understanding of our invention, reference is made in the following description to the accompanying drawing in which Fig. 1 represents a preferred embodiment of our invention for use on aircraft for the measurement of frequency over a range from 350 to 400 cycles per second. Figs. 2, 3 and 4 are vector diagrams explanatory of the operation of the frequency meter of Fig. 1. Fig. 5 is a preferred embodiment of our invention for a long-scale frequency meter having a frequency measuring range from 56 to 65 cycles, and employing an auxiliary field coil for compensating for armature reluctance torque. Figs. 6, 7 and 8 are vector diagrams explanatory of the operation of the frequency meter of Fig. 5. Fig. 9 represents a frequency meter which differs essentially from Fig. 5 in that it uses a magnetic circuit which causes little reluctance variation of the armature over the scale range and which therefore does not need the compensating winding of Fig. 5.

Referring now to Fig. 1, we have here represented one form of our frequency meter having a field core preferably made up of magnetic laminations having a circular yoke 1 with a core part 2 across the diameter and containing an armature coil air gap with a fixed circular magnetic core 3 therein. The magnetic circuit is energized by a field coil 4 connected to the frequency source 5 to be measured through a circuit containing a current limiting resistance 6, condensers 7 and 8, and an inductance 9 which may be variable by means of an adjustable iron core. Pivoted in the air gap about core 3 is an armature coil 10 to which is attached a pointer 11. Lead-in spirals, one of which is shown at 12, are provided to connect the armature across an impedance in the field circuit which consists of condenser 8 and inductance 9. The armature loop circuit also contains a loading inductance 13 and preferably also temperature compensating resistor or resistors 14 and 15, and a calibrating adjusting resistor 16.

The pointer 11 cooperates with a frequency measuring scale 17 which in the example to be described is calibrated from 350 to 450 cycles per second. One or both of the lead-in spirals 12 may be adjustable for initial calibration. These lead-in spirals are not intended to produce much torque, nor are they required to carry much current, and can therefore be made very light. We have found it convenient to have a small spiral spring torque adjusted to bias the pointer to the position shown in Fig. 1 a few degrees below the low end of the scale when the instrument is de-energized. However, as indicated above, this spiral spring torque is small and of little significance in the operation of the meter and could be adjusted otherwise than as above specified, or omitted entirely. As we will point out hereinafter, this spring torque, if present, may be taken into consideration in the calibration of the instrument in a useful way.

The condenser 7 could be omitted but is used to improve the power factor of the field circuit and keep the volt-ampere burden low. The condenser 8 and inductance 9 are essential and comprise a frequency sensitive impedance to furnish a voltage $E_1$ to the armature circuit, the phase angle and magnitude of which vary with frequency. In this form of the invention we find it desirable to have this impedance operate at resonance when the frequency is within the measurement range, for example, at about 420 cycles. For best sensitivity the inductance 13 in the armature circuit is desirable and should have an inductance comparable to the resistance in the armature circuit such that phase angle between current and resultant voltage of the armature loop circuit should be as near as practicable to 45 degrees at the average frequency encountered. The resistances 14, 15 and 16 are not essential to the frequency measuring principle employed but are desirable for temperature compensation and calibration purposes as will be referred to later.

It will be evident that when the field coil 4 is energized the flux produced thereby in the armature air gap will induce a voltage designated $Ea$ in the armature for all positions except a central armature position of zero mutual inductance. When the armature is moved through this zero mutual inductance position, the voltage induced therein will reverse in phase with the reversal of the relative direction of flux through the armature coil. This induced voltage varies with the armature position and increases as the armature coil is turned away from the central neutral position so as to allow more field flux to thread the same.

The voltage $E_1$ across the frequency sensitive impedance formed by condenser 8 and inductance 9 varies with frequency both as regards phase angle and magnitude. The vectorial resultant of the two voltages in the armature circuit $Ea$ and $E_1$ determines the current flow in this circuit and such current reacting with the field flux determines the torque, if any, of the armature.

In Figs. 2, 3 and 4, the vector F represents the field flux crossing the air gap of armature coil 10. Vector $Ea$, Fig. 2, represents the voltage induced in the armature by the field flux when the armature is at the 350-cycle indicating position at the lower end of the scale. At 350 cycles the voltage $E_1$ is represented by the vector $E_1$ of Fig. 2. The resultant voltage is designated $Er$ and produces a current $Ia$ which is almost 90 degrees displaced from the field flux vector F. The torque produced is $Ia \times F \times \cos X$, where $X$ is the angle between flux F and current $Ia$. If $X$ were 90 degrees the torque would be zero, but $X$ is just sufficiently less than 90 degrees to produce an upscale torque that equals the very small downscale spiral spring torque and causes the armature to take the 350-cycle indicating position.

Fig. 3 represents in full lines the vector relations at 396 cycles and the position of zero mutual inductance of the armature coil. In this armature position $Ea$ becomes zero. $E_1$ has decreased in value and changed its phase angle at 396 cycles and since $Ea$ is zero, $E_1 = Er$, the resultant voltage. It produces a current $Ia$ in the armature coil which has a phase angle with respect to flux F somewhat less than in Fig. 2 and produces a slightly greater upscale torque as compared to Fig. 2, sufficient to equal the downscale torque of the control spring and hold the armature in the 396 cycle indicating position. The upscale torque may be represented by the vertical projection of the current vector on the horizontal flux vector F. To assist in illustrating the operation, let us assume that at 396 cycles, which produces voltage $E_1$ of Fig. 3, we forcibly turn the armature back to the 350-cycle indicating position and hold it there by hand. If this were done, a voltage $Ea_1$ indicated in dotted lines in Fig. 3 would be induced in the armature circuit and would combine with $E_1$ of Fig. 3 to produce a resultant voltage approximately as represented by the dotted line vector $Er_1$ of Fig. 3. This would produce an appreciable armature current $Ia_1$, Fig. 3, nearly in phase with the field flux F, and a correspondingly large upscale restoring torque would result which would move the pointer upscale if the armature were now released. In moving upscale the armature induced voltage would decrease until the resultant torques acting on the armature are zero and the conditions are restored to those represented by full line vectors of Fig. 3.

When the frequency increases to 450 cycles, $E_1$ changes its phase angle to that represented in Fig. 4. When the armature moves to the 450-cycle indicating position, its induced voltage is as represented in Fig. 4. It is noted that $Ea$ is reversed with respect to that shown in Fig. 2, because the armature has passed through the neutral or zero mutual inductance position and the relative direction of the field flux therethrough has reversed. The resultant voltage $Er$, Fig. 4, produces the armature current $Ia$ there shown having such magnitude and phase angle with respect to the field flux F as to produce an upscale torque equal and opposite to the downscale spiral torque at this deflection. In all cases the armature current $Ia$ lags behind the resultant voltage $Er$ in the armature circuit because of the loading inductance 13 in such circuit. If this inductance were removed, the armature current would be greater and more nearly in phase with the resultant voltage $Er$ and more nearly in phase with the field flux, and it would be necessary to provide considerably more downscale spring torque to obtain acceptable deflection characteristics. It can be shown mathematically that the ideal condition so far as maximum sensitivity is concerned is to have the armature current lag behind the resultant armature circuit voltage by 45 degrees, and that maximum restoring torque is obtained when the phase angle between induced armature voltage $Ea$, in the case of Figs. 1 to 4 and 9, and the voltage $E_1$ derived from across the impedance 8—9, in the steady-state deflection condition, is 135 degrees. Thus, in Fig. 4, the ideal condition for maximum sensitivity is to have the angle between $Ia$ and $Er$ = 45 degrees, and for maximum restoring torque to have the angle between $Ea$ and $E_1$ = 135 degrees. In the design of the instrument these ideal conditions are kept in mind and approached so far as other practicable considerations permit, and explain the presence of inductance 13. In the instrument of Fig. 1 the impedance 8—9 is tuned to resonance within the frequency measuring range and occurs at about 420 cycles. If a greater frequency measurement range were desired, this impedance would in general be less sharply tuned and for a smaller frequency measurement range this impedance would in general be more sharply tuned.

The purpose of the temperature compensating resistance comprising parallel connected resistances 14 and 15 is simply to prevent changes in resistance of the armature circuit and, hence, changes in its power factor with changes in temperature. The compensating resistance used has a negative temperature coefficient of resistance so that when the copper resistance in this circuit increases with temperature, it is offset by a corresponding decrease in resistance in the compensating resistor. Parallel resistance sections 14 and 15 are indicated, because it is generally easier to obtain the desired over-all compensation with two sections of somewhat different temperature coefficients than it is with one section. The calibrating resistance 16 may be used for adjusting the pointer positions at the extremities of the scale. It has no effect on the pointer position near the center of the scale when the armature is in the neutral condition of zero mutual inductance. Decreasing the resistance 16 in shunt to the armature decreases the armature current and torque. The resistance 16 and the inductances 9 and 13 may be varied for initial calibration purposes, but after the instrument is calibrated further adjustment is not required.

In order to give a practicable example, but without intending to limit the invention, we may use the following circuit constants for the instrument of Fig. 1:

Line voltage 120 volts
Resistance 6, 25,000 ohms
Turns in coil 4, 5000
Condenser 7, 0.03 microfarad
Condenser 8, 0.20 microfarad
Inductance 9, 2600 turns iron core resistance 210 ohms
Armature coil 10, 1000 turns
Inductance 13, 1500 turns iron core
Shunt resistance 16, 4960 ohms
Resistance 14, 1200 ohms at 38 degrees C. with negative temperature coefficient of resistance
Resistance 15, 2690 ohms with negligible temperature coefficient of resistance For such an instrument:

Under the conditions of Fig. 2 the armature current is 0.004 ampere; $E_a=4.6$ volts and $E_1=12.4$ volts.

Under the conditions of Fig. 3 the armature current is 0.002 ampere; $E_1=7.5$ volts.

Under the conditions of Fig. 4 the armature current is 0.0025 ampere; $E_a=11$ volts and $E_1=6.8$ volts.

For use on aircraft such an instrument has been built with a cylindrical case 2½ inches in diameter, with all of the circuit elements contained therein behind the instrument.

Referring now to the instrument of Fig. 5 which embodies the same principles of operation as the instrument of Fig. 1 but which uses a different form of magnetic circuit and includes an auxiliary field coil for compensating for armature reluctance torque present in this instrument because of the shape of the magnetic circuit employed, the instrument is represented as having a frequency measurement range of from 56 to 65 cycles, and circuit constants and operation will be described for such frequency measurement range. Also because the position of zero mutual inductance of the armature comes at one end of the scale, the operation of this instrument is completely on one side of such zero mutual inductance position.

The circuit elements corresponding to those of Fig. 1 are designated by like reference characters. Armature coil 10a and main field coil 4a correspond to armature coil 10 and field coil 4 of Fig. 1. The lead-in spirals for the armature coil are not shown but will be arranged to produce small torque having little significance in the operation of the instrument except as may be hereinafter mentioned. The magnetic circuit comprises the outer laminated yoke part 18 and the inner hooked shape core part 19 joined to the yoke by the tongue 20 about which the main field coil 4a is wound. The inner periphery of the outer yoke 18 and outer periphery of the inner core 19 form pole pieces defining a concentric air gap 21 extending over an arc in excess of 200 degrees. The field coil 4a produces a flux across this gap which preferably has a uniform distribution. The armature coil 10a threads the hooked shape core 19 with one side in gap 21 and the other side adjacent the shaft and is mounted on the shaft with the pointer 11. The shaft is at the center of the air gap circular arc. The field 4a and armature coil 10a are connected as and for the purpose shown and explained in connection with Fig. 1 for coils 4 and 10, respectively.

The instrument of Fig. 5 has in addition to other torques discussed in connection with Fig. 1 a reluctance torque which must be considered. The reluctance torque occurs when the coil 10a is energized, due to the tendency of the armature to move to a position of minimum reluctance near the neck of the hooked shape core. This reluctance torque may be largely compensated for and, in fact, is slightly more than compensated for in our frequency meter, to be described, by the auxiliary compensating coil 22 wound on tongue 20 and connected in series with the armature coil 10a. Such compensation is explained in United States Patent No. 2,154,307 to Hall, April 11, 1939, in a wattmeter. The compensating coil 22 is wound about tongue 20 in such direction as to produce a flux in the C-shaped core 19 which opposes the flux produced by armature coil 10a and tends to repel coil 10a towards the open end of the hook 19.

In the instrument of Fig. 5 the principal torques influencing the operation are believed to be (1) the dynamic torque discussed in connection with Fig. 1 and which is proportional to the component of armature current in phase with the field flux; (2) any uncompensated reluctance torque; and (3) any spiral spring torque. The reluctance torque has a variation which is related to the square of the armature current. It also varies with the deflection angle and is influenced by flux density. The spiral torque is or can be made sufficiently small in comparison to the other torques that its effect can be neglected. The instrument armature seeks a position where the sum of these torques is zero. In the instrument to be described we provide in general a downscale compensated reluctance torque and an upscale dynamic torque over the measurement range. These torques in the steady-state condition do not change greatly over the measurement range. The dynamic torque can be analyzed quite accurately and may be considered to be equal and opposite to the compensated reluctance torque plus or minus any insignificant spiral spring torque. In going from 56 to 65 cycles, the armature position for zero resultant torque varies with frequency in such a manner as to obtain desirable frequency meter deflection characteristics. The principal dynamic torque factors existing at the low end of the frequency scale, which is made 56 cycles in order to have 60 cycles come at the middle of the scale, are represented vectorially in Fig. 6. Here the mutual inductance of the armature coil is zero or substantially zero because practically none of the field flux threads the same, and the voltage induced in the armature by such field flux $E_a$ may be considered to be zero. The armature current $I_a$ is therefore produced entirely by the voltage $E_c$ introduced into the armature circuit by compensating coil 20 and the voltage $E_1$ introduced into the armature circuit from across the frequency sensitive impedance comprising condenser 8 and inductance 9. The vector resultant of voltages $E_c$ and $E_1$ is represented by resultant vector voltage $E_r$, and the latter voltage produces the armature current $I_a$. The component of $I_a$ in phase with field flux vector F represents the upscale dynamic torque. Since this is a steady-state condition at 56 cycles, the remaining torque is a downscale torque equal and opposite to such dynamic torque and is primarily the compensated reluctance torque.

Fig. 7 represents the vector analysis of the steady-state dynamic torque condition for midscale, 60-cycle frequency and armature position. Approximately half of the field flux crossing the armature air gap does so threading the armature coil 10a, and as a consequence, the voltage Ea, Fig. 7, is induced into the armature circuit thereby. Ec represents the voltage introduced into the armature circuit by compensating coil 20. It is somewhat larger than in Fig. 6 due to change in frequency and field current. It is also noted that Ec and Ea are 180 degrees out of phase or in opposition. This is necessarily so because Ec is introduced to oppose or compensate for the upscale reluctance torque. The difference between these opposing voltages is represented by the vector Eg. E1, Fig. 7, represents the voltage introduced in the armature circuit from across the frequency sensitive impedance 8—9. This vector is slightly shorter and has advanced slightly in phase position as compared to Fig. 6, due to the increase in frequency. The resultant voltage is represented by the Er vector and the armature current by Ia. Ia, Fig. 7, has increased in magnitude somewhat as compared to Fig. 6 and has a larger inphase torque component with field flux F which has also increased slightly. This results in a slight increase in the dynamic torque which, neglecting any change in the spiral spring torque, may be considered to be equal and opposite to an increased compensated reluctance torque as compared to the 56-cycle condition.

To illustrate the deflection torque between the 56- and 60-cycle positions, assume that we temporarily restrain the armature in the 56-cycle position and increase the frequency to 60 cycles. Using the 60-cycle Ec and E1 vectors of Fig. 7 and omitting the now nonexisting Ea vector, the resultant voltage in the armature circuit will be about twice as large as in Fig. 7 and will be advanced counterclockwise slightly in angular position, and will produce a correspondingly increased armature current more nearly in phase with the field flux F. Hence, the upscale torque will be at least double that represented in Fig. 7 and will, of course, deflect the armature upscale, when the latter is released, to the 60-cycle position where the torques acting on the armature are again equalized.

Fig. 8 represents the dynamic torque determining vector relations existing for the steadystate condition at 65 cycles. The principal changes as compared to the 60-cycle condition are a further decrease in the E1 voltage vector with a slight advance in its phase position and an increase in the Ea vector. The steady-state dynamic torque is practically the same as at 60 cycles, and is equal and opposite to the algebraic sum of all remaining torques. If at 65 cycles the armature is forcibly displaced in either direction from the 65-cycle indicating position, a differential torque will appear, such as to return the armature to the 65-cycle position when released.

In the frequency meter of Fig. 5, as described, the impedance 8—9 operates below its resonant frequency. For example, it is adjusted for resonance at about 69 cycles, which seems best for the design and frequency measurement range described. It may be pointed out that this particular design has erratic torque characteristics at a frequency point below the measurement range. The design is made such by a sufficiently large value of inductance 13 that the erratic torque behavior comes well below the frequency corresponding to the low end of the scale, for example, at 40 cycles. Over and closely adjacent the frequency measurement range selected the performance is very stable and satisfactory. A more complete analysis of the frequency responsive performance of this instrument could be given, but it would be quite complicated and appears to be unnecessary for a satisfactory understanding of the invention.

The instrument of Fig. 5 is preferably provided with temperature compensation and with calibration adjustment features, such as were referred to in connection with the frequency meter of Fig. 1. Thus, across the armature coil 10a there is connected a scale calibrating adjustable resistance 16. Adjustment of this resistance does not influence the deflection at the low end of the scale where the mutual inductance of the armature coil 10a is zero. It has its maximum influence at the upper end of the scale and a proportional influence at intermediate points. Increasing the shunt resistance at 16 increases the effective current in the armature circuit and the upscale deflection.

While the temperature compensating resistance may be placed in either the armature circuit or the control circuit, in this design it is placed in the control circuit between the impedance elements 8 and 9, and comprises parallel resistances 14a and 15a. In either case the relation to be obtained is that for a zero change in deflection for a change in temperature the positive temperature coefficient of resistance in the armature circuit must equal the negative temperature coefficient of resistance in the control circuit or vice versa. Placing the compensation in the control circuit has the least effect in reducing the instrument displacement torque. To obtain the correct linear temperature coefficient, it is generally easier to use parallel resistance elements, such as shown, and one of which has a negative temperature coefficient of resistance.

In order to give a practical example of circuit constants and currents and voltage values for the high sensitivity 60-cycle meter of Fig. 5, but not by way of limiting the invention, the following values have been found satisfactory in the instrument and circuit of Fig. 5. The laminated magnetic core structure used was that of a standard alternating wattmeter with uniform air gap and operated at a flux density reasonably below saturation.

Field coil 4a, 3000 turns
Compensating coil 20, 400 turns
Armature coil 10a, 460 turns
Normal line voltage, 120 volts
Condenser 7, 0.68 microfarad
Condenser 8, 1.75 microfarads
Inductance 9, 3.1 henrys, 58 ohms
Inductance 13, 5.8 henrys, 98 ohms
Resistance 14a, 56 ohms at 38° C. negative temperature coefficient
Resistance 15a, 150 ohms zero temperature coefficient
Resistance 16, 1000 ohms
Angle of deflection of 56—65 scale, 250 degrees In the case of Figs. 5 to 8 where we have the compensating voltage Ec to contend with, the ideal condition for maximum restoring torque is where Eg is 135 degrees from E1.

In Fig. 7:

$E_1$=about 16 volts with other voltage vectors in the proportions shown.
$I_a$=about 0.015 ampere.

In calibrating the instrument, we adjust 9 to obtain correct reading at the low end of the scale at 56 cycles. Then resistance 16 which is previously set at maximum value is reduced until 60 cycles come at or about the middle of the scale. This does not change the 56-cycle point.

Frequency meters embodying our invention may employ a magnetic field structure, such as is shown in Fig. 9, where the magnetic core structure is made up of the circular yoke part 23 with center pole piece 24 and the split tongue and core part 25. A uniform circular air gap of the order of 250 degrees is provided between the core 25 and tongue 24; 10b represents the armature coil and 4b the field coil. The operation will be essentially the same as that of the instrument of Fig. 1 except that it will have a longer scale arc. It does not use the reluctance torque compensating coil of Fig. 5 because a negligible reluctance torque exists with this core structure. The zero mutual inductance position of the armature is at the midscale position represented.

In any of the instruments described the scale distribution may be modified by nonuniformity of the air gap. However, the operation of this instrument does not depend upon a nonuniform flux crossing the gap at different armature coil positions over the active range of operation, and in the instruments described the flux crossing the gap at all active coil positions is uniform. Also the operation of this instrument does not depend upon a variation of self-inductance of the armature coil, since in Figs. 1 and 9 the self-inductance of the armature is uniform or substantially so for all armature positions, and in Fig. 5 the effect of variation in self-inductance of the armature coil is neutralized by the compensating coil 22. The operation of this instrument depends upon the variation in the mutual inductance relation between the field and armature coil fluxes, the latter being subject to frequency control by reason of the frequency responsive voltage introduced into the armature coil circuit from the frequency sensitive impedance 8—9.

In accordance with the provisions of the patent statutes we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. A mutual inductance device responsive to the frequency of an alternating electrical quantity, comprising a magnetic structure having an air gap, a coil having a portion positioned in said air gap, said magnetic structure including a magnetic portion embraced by said coil, means mounting said coil for movement relative to said magnetic structure to direct said portion through said air gap, an energizing winding on said magnetic structure for producing a flux across said air gap and through said coil, an alternating current energizing circuit including said energizing winding and a frequency responsive impedance in series relation, a circuit for connecting said coil across said impedance, a loading inductance in the last mentioned circuit, said coil having positions in said air gap of variable mutual inductance with respect to the energizing winding on said magnetic circuit including a position of zero mutual inductance, said position being subject to control by the voltage introduced into the circuit of said coil from across said frequency sensitive impedance varying in magnitude and phase angle with changes in frequency.

2. A mutual inductance frequency meter, comprising a stationary magnetic field structure having a uniform flux air gap, an armature coil rotatively mounted for movement in said gap, said stationary magnetic field structure including a magnetic portion embraced by said armature coil, an energizing winding on the stationary magnetic circuit for producing flux across its gap and through the armature coil, the field flux through said armature coil varying with the mutual inductance relation position of the coil with respect to said flux, a frequency responsive impedance comprising an inductance and capacity, an alternating current energizing circuit including said winding and impedance in series relation, connections from across said impedance to said armature coil for introducing a control voltage into the armature circuit which varies with the frequency of the energizing circuit, and a loading inductance included in the armature circuit, said armature coil taking different mutual inductance positions in response to changes in frequency.

3. A mutual inductance frequency meter, comprising a stationary magnetic field circuit containing an air gap, an armature coil contained in said gap, a stationary iron core included in said magnetic field circuit embraced by said armature coil, a field winding on said magnetic circuit for producing a flux across said gap, said coil having a zero mutual inductance position in said gap where none of the field flux threads the same and a range of deflection in opposite directions from such position where a variable amount of the field flux threads the armature coil, the relative direction of the flux through the armature coil being reversed when the armature is on opposite sides of the zero mutual inductance position, an alternating current energizing circuit for said field winding, a frequency responsive impedance included in said energizing circuit, connections for energizing said armature coil from across said impedance, and a loading inductance included in said connections, the position of said armature coil varying with frequency over its range of deflection and through the zero mutual inductance position by reason of its variation in mutual inductance and the voltage introduced into its circuit from the frequency responsive impedance.

4. A mutual inductance frequency meter, comprising a magnetic field circuit containing an air gap, a winding on said field circuit for producing a flux across said gap, an armature coil rotatively mounted for movement in said gap over a range of operation from a zero mutual inductance position where no field flux threads the coil to a maximum mutual inductance position where substantially all of the field flux threads the core, said field structure having a shape such as to cause the armature to have a reluctance torque in a direction to increase its mutual inductance, an alternating current energizing circuit for said winding, said circuit including a frequency responsive impedance, connections between said impedance and armature coil for introducing into the armature circuit a voltage which changes with frequency, an auxiliary coil on said field structure for introducing into said armature circuit a voltage in opposition to the voltage induced therein through the armature coil by the field flux for compensating for the reluctance torque of said armature coil, and a loading inductance in said armature circuit, said armature coil varying its mutual inductance position in response to changes in frequency over the aforesaid range of operation.

5. A mutual inductance frequency response device, comprising a magnetic field structure having an air gap, a field winding thereon for producing flux across said gap, an armature coil mounted for movement through said gap in varying mutual inductive relation with respect to the field flux, said magnetic field structure including a magnetic portion embraced by said armature coil, an alternating current energizing circuit for said field winding, said circuit including a frequency sensitive impedance, a circuit including a loading inductance between said impedance and armature coil for introducing a frequency responsive changing voltage into the armature coil circuit, the constants of said armature circuit being so proportioned as to approach so far as practicable the conditions where the armature current lags 45 degrees behind the resultant voltage of its circuit and the voltage from across the impedance and the remaining voltage of the armature circuit are 135 degrees out of phase within the frequency measurement range of the meter.

ALMON J. CORSON.
THEODORE A. RICH.

REFERENCES CITED

The following references are of record in the file of this patent:

UNITED STATES PATENTS

| Number | Name | Date |
|---|---|---|
| 1,614,202 | Lenehan | Jan. 11, 1927 |
| 2,125,151 | Boekels | July 26, 1938 |
| 2,218,376 | Corson | Oct. 15, 1940 |
| 2,408,218 | Lenehan et al. | Sept. 24, 1946 |
| 2,411,010 | Stimson | Nov. 12, 1946 |